April 7, 1959     M. F. KEATHLEY, SR., ET AL     2,880,850
CONVEYOR APPARATUS FOR FOODSTUFFS
Filed May 8, 1956                                  2 Sheets-Sheet 1
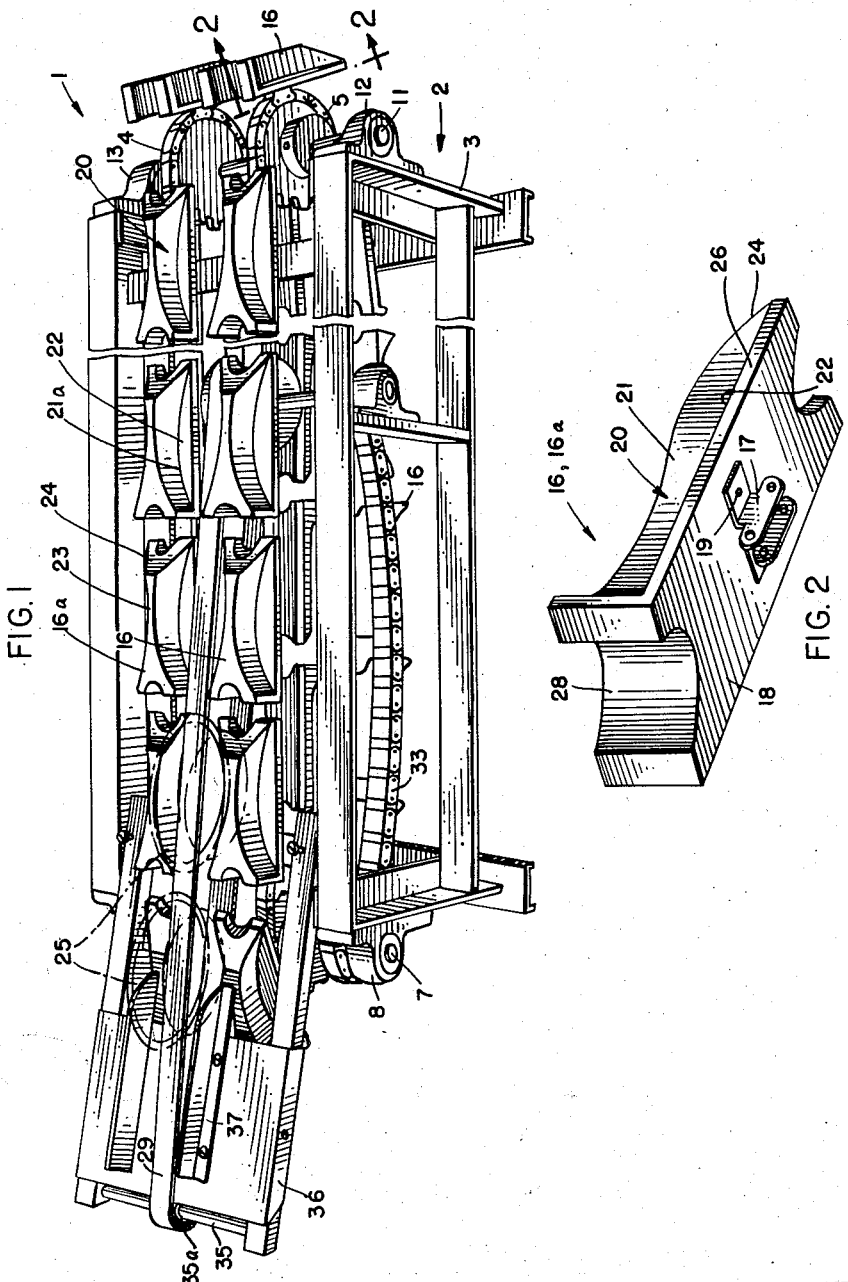
INVENTORS:
MAURICE F. KEATHLEY, SR.
ROBERT O. MANSPEAKER
BY
ATT'YS April 7, 1959  M. F. KEATHLEY, SR., ET AL  2,880,850
CONVEYOR APPARATUS FOR FOODSTUFFS
Filed May 8, 1956  2 Sheets-Sheet 2
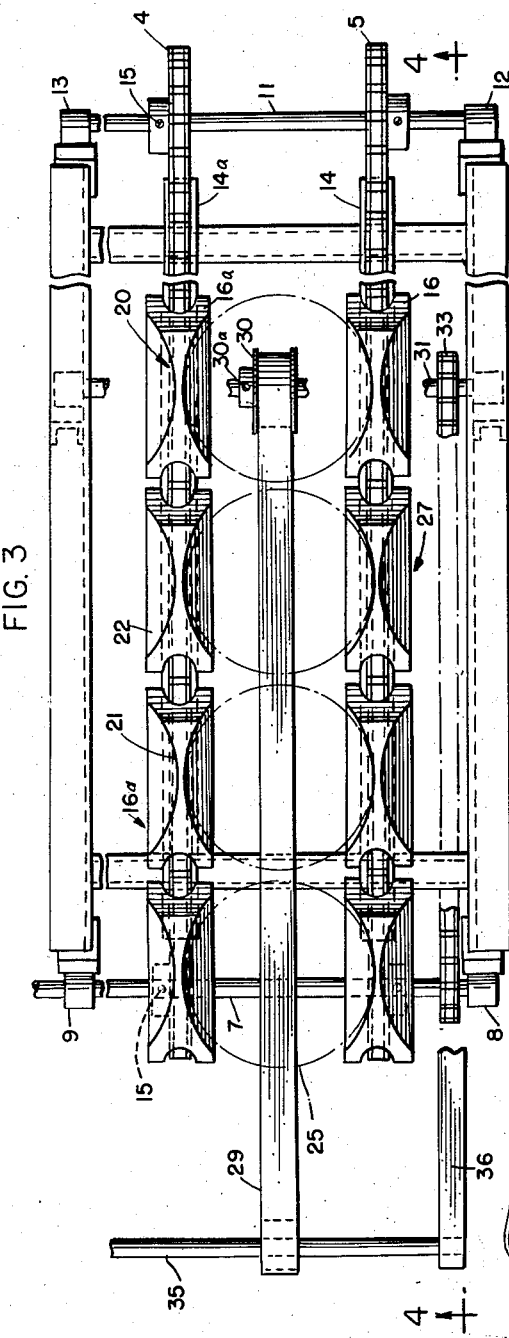
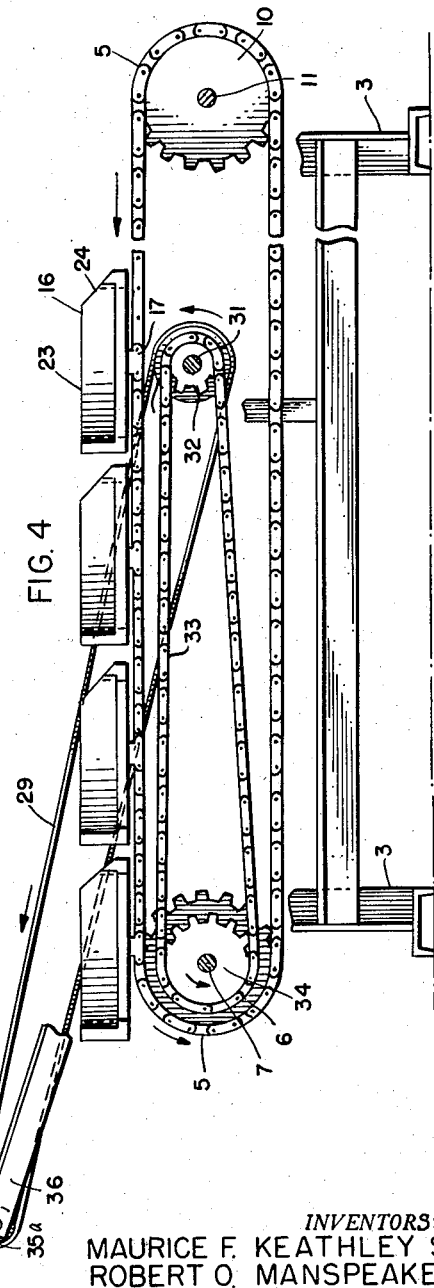
INVENTORS:
MAURICE F. KEATHLEY SR.
ROBERT O. MANSPEAKER
BY
ATT'YS

United States Patent Office 2,880,850
Patented Apr. 7, 1959

2,880,850

CONVEYOR APPARATUS FOR FOODSTUFFS

Maurice F. Keathley, Sr., and Robert O. Manspeaker, Memphis, Tenn.

Application May 8, 1956, Serial No. 583,442

3 Claims. (Cl. 198—185)

This invention relates to conveyor apparatus for transporting articles of food, especially receptacles and the like containing foodstuffs. The apparatus is particularly useful for conveying bakery goods and other foodstuffs in receptacles, which are fragile or fluid in nature, tending to be easily damaged or spilled.

An important problem in the art of conveying foodstuffs is to provide apparatus for manufacturing, processing, or filling and conveying them, in or out of receptacles, and transferring them to successive apparatus and operations without damage or spillage. This problem is encountered with foodstuffs both prior to and subsequent to baking, freezing, and wrapping or packaging, in the manufacture of various food products, such as cakes, cookies, pies, tarts, and others.

It is therefore an object of the present invention to provide conveyor apparatus, including conveyors and food receptacle holder elements, which are especially advantageous in connection with the conveyance of articles of food, which overcome the disadvantages of prior constructions and furnish important improvements thereover.

An important object is to provide apparatus for conveying foodstuffs which require careful handling, that is, which are fragile or otherwise readily damaged, or which are prone to spillage.

Another object is to provide a conveyor assembly which serves to transport bakery goods between processing points, and serves to remove the receptacles from a conveyor and convey them elsewhere, to a further conveyor or collector, as desired.

A particular object is to provide a food receptacle holder element especially useful for transporting food receptacles and for removing the receptacles therefrom.

A further object is to provide a versatile adjustable apparatus which is adapted to use with various types and sizes of receptacles, containing different types of foodstuffs.

Another object is to provide a compact, relatively simple, yet reliable and effective conveyor assembly and food receptacle holder element constituting a part of the assembly. The apparatus is especially suitable for rapid, continuous operation in large bakeries where quantity production of high quality products is desired.

These and other objects, advantages and functions of the invention will be apparent on reference to the specification and to the attached drawings, in which like parts are identified by like reference characters in each of the views, and in which:

Figure 1 is a broken top perspective view of a conveyor assembly according to a preferred embodiment of the invention;

Figure 2 is a bottom perspective view of a preferred food receptacle holder element as also illustrated in the other views;

Figure 3 is a broken top plan view of an assembly corresponding to that illustrated in Figure 1; and Figure 4 is a broken side elevational view thereof with parts broken away to reveal interior construction.

The invention resides particularly in a new combination and arrangement of apparatus for accomplishing the desired objects, and in a food receptacle holder and the combination therewith, especially useful in the conveyor assembly or in other apparatus of similar type. More particularly, a conveyor assembly for transporting foodstuffs is provided, which includes a conveyor, recessed bakery receptacle holders movable therewith and having bottom openings in the recessed portions of the holders, and another conveyor arranged to contact articles through the openings and unseat them from the holders.

Preferably, the receptacle holder of the invention includes a pair of complementary recessed bakery receptacle holder elements, each of which is movable with one of a pair of parallel conveyors. Means are preferably provided for varying the conveyor spacing. Most advantageously, the apparatus removes receptacles from the receptacle holders by elevating the receptacles therefrom at a slight angle, employing a conveyor at an angle to the conveyor for the holders, the conveyors being driven synchronously in the same direction.

The drawings illustrate a complete conveyor assembly 1 for transporting articles or receptacles from filling or processing locations and the like to a point where they are removed for other processing, packaging or distribution. A supporting structure 2 is illustrated which includes a frame 3. A pair of spaced parallel, endless chain conveyors 4 and 5 are mounted on the frame for movement in vertical planes, and they may extend and travel longitudinally of the assembly 1 beneath various loading, filling, topping and other processing machines, as in the usual bakery operations.

The parallel conveyors 4 and 5 are driven by forward drive sprockets 6 (see Figures 3 and 4) which are mounted on a transverse drive shaft 7, driven by conventional means not shown, and mounted or journalled in bearings 8 and 9. At the rear terminus of the endless conveyors, the conveyors are supported by sprockets 10 mounted on a transverse shaft 11 seated in bearings 12 and 13. The bearings 8, 9, 12 and 13 are mounted on the frame 3 of the supporting structure, and the several sprockets are laterally adjustably mounted on the shafts 7 and 11 by means of set screws 15, or the like. The conveyors 4 and 5 travel in horizontal planes at the top of the supporting structure 2, in parallel longitudinal channels or guideways 14 and 14a, which are also laterally adjustably mounted on the structure for varying their spacing, by conventional means not shown. By this construction, the conveyors 4 and 5 can be spaced apart as desired, to accommodate receptacles having various sizes and shapes.

Pairs of spaced parallel complementary bakery receptacle holder elements 16 and 16a are mounted on the parallel conveyors 4 and 5 for movement therewith, by means such as links 17, fastened to the bases 18 of the holder elements, such as by bolts or screws 19. The links replace corresponding links in the conveyor chains, and they serve to maintain the holder elements in fixed relation to each other and to the conveyors. The holder elements 16 constitute elongated blocks or bodies of moderate thickness or height. Each of the elements is provided, in its opposite long sides, with a pair of like segmental dish or pan-shaped recesses, recessed portions or depressions 20, for seating a receptacle in a pair of adjacent opposed holder elements 16, 16a constituting one complete holder. The recessed portions in the holder elements are defined by a corresponding pair of oppositely and outwardly directed, arcuate, vertically arranged, laterally recessed portions 21, and a pair of generally horizontal, arcuate ledges, shoulders or flanges 22 adjoining the recessed portions at the bases 21a thereof. The ledge portions 22, on opposite sides of the holder elements 16, form component parts of the flat or plane base 18 of the element. The inwardly recessed portions 21 and the adjoining ledges 22 serve to receive and provide a seat for receptacles of various types, especially circular or rounded receptacles, and they hold the receptacles in position for filling and other processing operations, and in transporting them from one location to another.

The holder elements preferably have a substantially flat horizontal top surface 23, which serves as a seat or support for shallow pans, such as pie tins and the like, in which case the receptacles may or may not rest on the ledges 22. The rear end 24, or both ends, of the holder element is bevelled so that it slopes or is inclined upwardly and inwardly from the base 18, to provide clearance in the assembly and avoid interference with the receptacles being removed from the holders, such as with the cake pans 25 illustrated in the drawings. While only one end is bevelled in the illustrative embodiment, the opposite end is also bevelled in like manner, at times, to furnish a complementary reversible and interchangeable holder element. However, the holder element 16 illustrated is also interchangeable from one conveyor, such as 4 or 5, to another. In this connection, it will be noted that the opposite long sides 26 of the holder element are mirror images of each other.

Only two parallel conveyors 4 and 5 are illustrated, inasmuch as the construction and operation are adequately shown thereby, but as indicated by the broken construction in Figure 3, a greater plurality of conveyors may be arranged in parallel side-by-side spaced relation in the same horizontal planes, each conveyor having mounted thereon an aligned series or file of holder elements 16, so that lateral rows or ranks of receptacles, such as 25, may be conveyed simultaneously. The holder elements 16 are especially useful in this construction, each recess 20 seating a part of two laterally adjacent receptacles traveling in parallel longitudinal files of receptacles. The outermost file 27 (Figure 3) of holder elements may, if desired, be constructed with but one recess 20, on one side of the element, the inner side, since there would be no further laterally adjacent conveyor. Preferably, however, the holder elements 16 are the same throughout the apparatus, so that they readily may be interchanged. The holder elements are also provided with vertical notched portions 28 at each end.

The holder elements 16 are mounted entirely around the endless chains 4 and 5, traveling in horizontal planes at the top of the supporting structure 2 for filling and removing operations, and returning to the starting points by traveling with the chain along the bottom of the structure 2.

The holder elements containing filled receptacles 25 are conveyed to a point toward the forward end of the supporting structure where the receptacles are removed by a centrally spaced conveyor belt 29 which extends in the same direction between the elements from a point below to a point above the elements. At this removal point or zone, the endless flat conveyor belt 29 is mounted on the supporting structure 2 with its upper surface at a slight angle, which should be a maximum of about 8°, from the horizontal, for removing the receptacles from the holder elements. The conveyor belt is mounted for longitudinal movement in vertical planes centrally between the conveyor chains 4 and 5 on a drive roller 30 adjacent the point where removal commences. The drive roller is laterally adjustably mounted on a transverse drive shaft 31, by means of set screw 30a or the like, for adjusting and centering the conveyor belt 29 between the holder elements 16, 16a. The drive shaft 31 is in turn driven by a small coupling sprocket 32. An endless drive chain 33 connects the latter sprocket with a coupling sprocket 34 having a greater diameter, mounted on the aforementioned drive shaft 7, for driving the parallel conveyor chains 4 and 5 and the conveyor belt 29 synchronously in the same direction. Thus, the belt drive shaft 31 is driven in tandem and is drivingly coupled to the main drive shaft 7. This constitutes a preferred construction for insuring that the conveyor belt 29 and the parallel conveyor chains 4 and 5 are driven at the same horizontal speed. To achieve this result, the belt 29 must of course travel at a greater linear velocity than the conveyor chains 4 and 5, and the diameters of the drive roller 30, the conveyor chain drive sprockets 6, and the coupling sprockets 32 and 34 are correspondingly related to one another.

In this manner, and maintaining the slope of the conveyor belt within about 8°, the open receptacles 25 are moved out of the holder elements 16 without damage to the contents and without tipping or spillage. It has been found that this construction and arrangement guarantees the safe conveyance and removal of the receptacles of foodstuffs, whereas other constructions are unsafe or unreliable. Thus, it is not recommended that the conveyor belt 29 be arranged horizontally, with the conveyor chains 4 and 5 passing downwardly therefrom at the forward end of the structure, as spillage and jarring are prone to occur. The apparatus and arrangement furnish a high rate of travel and rapid, continuous operation.

The removing belt 29 is supported at its forward end on a freely rotatable idler roller 35a mounted on a transverse shaft 35. The idler roller is laterally adjustably mounted on the shaft by conventional means not visible. The roller shaft is supported forwardly in the sides of a guide platform 36 mounted at the forward end of the supporting structure 2. The belt 29 may extend forwardly of the frame 2 for any desired distance and may be appropriately supported in its forward portions on other structures. Longitudinal guide plates 37 are mounted on the platform and form a longitudinal guideway, to insure that the receptacles 25 remain centered on the removing belt 29. The receptacles are discharged from the removing belt to another conveyor or a collector, not shown, as desired. The conveyor chains 4 and 5 and the holder elements 16 turn under and reverse their direction of travel short or rearwardly of the guide platform and the guide plates. While the apparatus as illustrated in Fig. 1 includes only two parallel conveyors 4 and 5, and a single removing belt 29, it may be duplicated in the lateral direction as described above and represented in Figure 3, so that the guide platform 36 extends across the entire forward end of the structure 2, and successive rows of filled receptacles are discharged.

In operation in a bakery, the conveyor assembly 1 is aligned and registered with suitable apparatus for placing empty or filled receptacles on the conveyor and with filling, coating, icing and like apparatus. The receptacles may be initially seated or supported on pairs of the holder elements 16, 16a advantageously by reciprocating an arm with gripping means, such as a suction cup, up between the conveyor chains 4 and 5, between the holder element pairs, to pull a receptacle from a stack onto the holder. Receptacles also may be dropped or placed on the holders in other ways. The principal conveyor, comprising the endless chains 4 and 5, and the holder elements 16, 16a moveable therewith, travel with the receptacles through the several operations to the removal zone, which is the zone of the conveyor belt 29.

The conveyor belt 29 is spaced from the conveyor chains 4 and 5 and from the holder elements 16, 16a, centrally therebetween, and travels longitudinally of the assembly 1 at the same horizontal velocity and in the same horizontal direction, parallel to the conveyor chains, so that the filled receptacles 25 are gradually unseated and elevated, and then conveyed from the holders, without interference. In the embodiment illustrated, the conveyors have common drive means for positively controlling the conveyor velocities. However, the same results can be achieved in other ways, employing other standard apparatus, if desired.

Since the holder elements 16 and the recesses 20 thereof conform to the shapes of the receptacles, they are maintained in position and held against substantial displacement during the filling and processing operations, to insure accuracy therein. The conveyors 4 and 5 may therefore travel at a high rate of speed in timed relationship to other rapid operations with associated apparatus, such as depositors, needle fillers and strip icers. To maintain the rapid rate of travel, it is necessary that the receptacles be removed equally rapidly, and the combination with the conveyor belt 29 is especially suited to perform this function without danger of jarring, tilting or dropping the receptacles, thus avoiding crushing, distortion, spilling and other objectionable results.

The conveyor assembly 1 may also be operated in the reverse direction, by reversing the direction of travel of the conveyor chains 4 and 5, and of the conveyor belt 29. In this manner, receptacles containing foodstuffs may be transported by the belt to the holder elements 16 on the chains, smoothly and accurately transferring the receptacles of the holders for conveyance elsewhere.

The receptacles conveyed by the assembly are most advantageously rounded, dish or pan-shaped, and substantially flat-bottomed, and have a wide base relative to their height, with a relatively low center of gravity for the filled receptacles. The receptacles may or may not have an outwardly extending lip or flange. The construction and arrangement of the apparatus are such as to be especially adapted to cake pans, pie pans, tart containers and like receptacles constructed of sheet metal, metal foil, plastic, cardboard, paper and the like. The construction is also adapted for conveying articles of food which are not in receptacles, such as pies or pie shells, cookies and cakes.

The assembly is especially compact and requires a minimum number of parts. The holder elements 16 are advantageously constructed as lightweight aluminum castings, to reduce the weight of the assembly and avoid problems of corrosion and contamination. The holder elements are interchangeable and are easily assembled in pairs on adjacent conveyor chains, by fastening the links 17 thereto.

The invention is hereby claimed as follows:

1. A conveyor assembly for transporting bakery goods comprising in combination, a plurality of horizontal spaced parallel endless conveyors, means for varying the conveyor spacing, pairs of spaced complementary bakery receptacle holder elements mounted on adjacent said conveyors, individual said elements having segmental pan-shaped recesses on opposite sides thereof, an endless conveyor belt arranged between adjacent said conveyors at an angle thereto within about 8 degrees and extending in the same direction between said elements in one plane from below to above the elements, and means for driving the several said conveyors with the same horizontal component of velocity in the same horizontal direction.

2. A bakery receptacle holder element comprising a block having a substantially flat base mountable on a conveyor and a substantially flat top surface, a pair of outwardly directed arcuate recessed portions on opposite sides of said block, and a pair of corresponding substantially flat arcuate ledges adjoining said recessed portions and constituting components of said base, said elements being adapted for use in pairs to hold a bakery receptacle in each pair.

3. The combination in bakery conveyor apparatus of a pair of parallel conveyors, and a plurality of bakery receptacle holder elements mounted on each conveyor to form with the holder elements of the other conveyor a plurality of pairs of opposed complementary holder elements, each said holder element comprising a block having a substantially flat base mountable on a conveyor and a substantially flat top surface, a pair of outwardly directed arcuate recessed portions on opposite sides of said block, and a pair of corresponding substantially flat arcuate ledges adjoining said recessed portions and constituting components of said base and forming a pair of receptacle seats with the recessed portions.

References Cited in the file of this patent

UNITED STATES PATENTS

| | | |
|---|---|---|
| 683,039 | Hogen | Sept. 24, 1901 |
| 2,546,318 | Reyburn | Mar. 27, 1951 |